United States Patent [19]
Weiser

[11] 3,866,098
[45] Feb. 11, 1975

[54] ELECTRICAL MOTOR DRIVE SYSTEM WITH FIELD CONTROL OPERABLE IN MOTORING AND BRAKING MODES

[75] Inventor: Earnest Franklin Weiser, Erie, Pa.

[73] Assignee: General Electric Company, Erie, Pa.

[22] Filed: Jan. 14, 1974

[21] Appl. No.: 433,409

[52] U.S. Cl. .............................. 318/251, 318/381
[51] Int. Cl. ........................................ H02p 5/06
[58] Field of Search .................. 318/139, 246–251, 318/269, 273, 377, 381

[56] References Cited
UNITED STATES PATENTS

| | | | |
|---|---|---|---|
| 3,564,365 | 2/1971 | Zelina ............................... | 318/251 |
| 3,568,018 | 3/1971 | MacDonald .................... | 318/381 X |
| 3,590,352 | 6/1971 | Ries et al. ........................... | 318/246 |
| 3,656,038 | 4/1972 | Ries et al. ........................... | 318/139 |

*Primary Examiner*—James R. Scott
*Assistant Examiner*—W. E. Duncanson, Jr.
*Attorney, Agent, or Firm*—W. C. Bernkopf

[57] ABSTRACT

A d-c motor drive system, adapted for use in traction vehicles, wherein armature and motor field windings are connected in series during the motor mode. A converter is connected in parallel with the field, operates in the inverting mode during motoring to provide desired field weakening. During braking the motor fields are disconnected from the armatures and separately excited by the converter operating in the rectifying mode to provide desired field excitation.

21 Claims, 3 Drawing Figures

MOTORING

BRAKING

ELECTRICAL MOTOR DRIVE SYSTEM WITH FIELD CONTROL OPERABLE IN MOTORING AND BRAKING MODES

BACKGROUND OF THE INVENTION

This invention relates to direct current drive motor systems adapted to selectively drive or electrically retard heavy mechanical loads, such as traction vehicles, and more particularly to an improved arrangement for energizing motor field and motor armature windings during motoring and braking modes.

Electric drive systems for high inertia loads, such as traction vehicles, must be designed to propel the load, and to electrically retard, (commonly termed "electrically brake") the load, in accordance to predetermined torque vs speed relationships and other selected parameters. Direct current motors having armature and field windings are commonly used, and control can be effected by modification of armature current and of field flux. As described in applicant's U.S. Pat. No. 3,515,970 improved drive operation may be obtained by selectively controlling both armature current and field flux and by providing for smooth analog control, as opposed, to discrete stepped changes.

Drive systems for electric locomotives, transit cars and other high inertia loads must provide high starting torques and variable speed operation. They commonly utilize series direct-current electric motor, i.e., d-c motors having their motor armature and field windings connected in series. The use of series d-c motors, during motoring, is desirable because of their ability to resist the effect of power line transients. Power line transients can be more readily absorbed by the field connected in series with the armature. The propulsion torque of a d-c motor is proportional to the product of armature current and the field strength. At low motor speeds the counter emf is very low resulting in high armature current, and therefore high starting torques. As the motor speed, and therefore the counter emf, increases the torque diminishes rapidly. Adequate torques at higher speeds can be obtained by regulating motor armature current such as by modifying applied motor armature voltage or by varying the impedance in the armature circuit. However, this type of control is frequently inadequate to provide torque at high motor speeds, and additional field control, referred to as field weakening, is utilized to extend the torque at such high speeds. Field weakening is commonly attained by reducing the motor field current in respect to the armature current.

Control of electric retardation can similarly be obtained by armature and field control. During electric retardation, the motor acting as a generator provides armature current to a braking load, which in the case of "dynamic braking" consist of a resistance load, and in the case of "regenerative braking" constitutes the energy source of the motor. Braking torques may be controlled by modifying armature current, e.g., varying armature circuit impedance. However, field control may be required. For example, during braking, armature voltage is a function of motor speed. At high motor speeds, such as obtained during high speed operation of traction vehicles, the generated voltage may be excessive so as to cause motor commutation flashing. The armature voltage may also substantially exceed the voltage of the energy source so as to detrimentally affect regenerative braking operation. Field weakening control can therefore be utilized to limit armature voltage during electric regtardation.

Drive systems of the type discussed must be readily convertible between motoring and braking states. This generally requires a change of operating conditions such as reversal of the motor field or of the armature connection. This has, for example, been accomplished by switching the armature terminals so as to reverse armature polarity in respect to field polarity. However, excessive currents occur if the switching time is not precisely controlled so as to occur, for example, prematurely during an interval when motor current flows. Alternatively, mode switching has been accomplished by switching the field terminals so as to reverse the motor field. However, in such an arrangement, switching must be accomplished so that adequate field current is built up to overcome remnance motor flux. In general, switching self-excited series d-c machines from motoring to braking is subject to temporary voltage transients, resulting from the change of inductive armature currents, and in delays in affecting mode switching.

OBJECT OF THE INVENTION

It is therefore an object of this invention to provide an improved d-c motor control system readily and rapidly switchable between motoring and braking states.

It is a further object to provide such a system providing smoothly controllable field excitation in both motoring and braking state.

It is another object to provide such an improved motor control system permitting mode switching with minimal contactors.

It is an additional object to provide an improved d-c motor control system for traction vehicles providing smooth transition between motoring and braking modes and adaptable for regenerative and dynamic braking.

It is yet a further object to provide an improved d-c motor control system adapted to control plural traction motor groups with common armature and field control circuits.

SUMMARY OF THE INVENTION

The invention relates to a d-c motor propulsion system wherein a converter is connected in shunt with the motor field means of d-c motor means. During the motoring mode the field windings are connected in series circuit with the motor armature and the converter is operable in the inversion mode to provide desired field weakening by shunting a controlled portion of armature current. In the braking mode, the motor field is disconnected from the motor armature circuit and the converter is operable in the rectifying mode to provide desired magnitudes of field excitation.

The converter may utilize a phase controlled rectifier whose a-c input is supplied by an inverter energized from the d-c source. The preferred embodiment incorporates chopper means in the motor armature circuit for control of motor armature current during both motoring and braking modes. During the motoring mode, the chopper, armature means, motor-brake switching means and motor field means may be serially connected across the energy source, with freewheeling rectifying means, connected to parallel with the serially connected combination of the armature means, motor-brake switching means, and motor field means, poled to pass armature current during intervals when the chopper means is cutoff. The motor-brake switching means is opened during the braking mode. Field current of opposing polarity is then provided by the conversion means operating in the rectifying mode, and a braking energy dissipation circuit is coupled in circuit with the armature means to pass armature current during turn off of the chopper while in the braking mode. Provision is made to selectively utilize dynamic or regenerative braking. Plural parallel connected motor groups may be controlled by a common armature chopper and a common conversion arrangement.

The novel features believed characteristic of this invention are set forth with particularity in the appended claims. The organization and manner of operation of the invention, together with further objects and advantages thereof, may best be understood by reference to the following description taken in conjunction with the accompanying drawing in which:

DESCRIPTION OF THE PREFERRED EMBODIMENT

Figure 1:
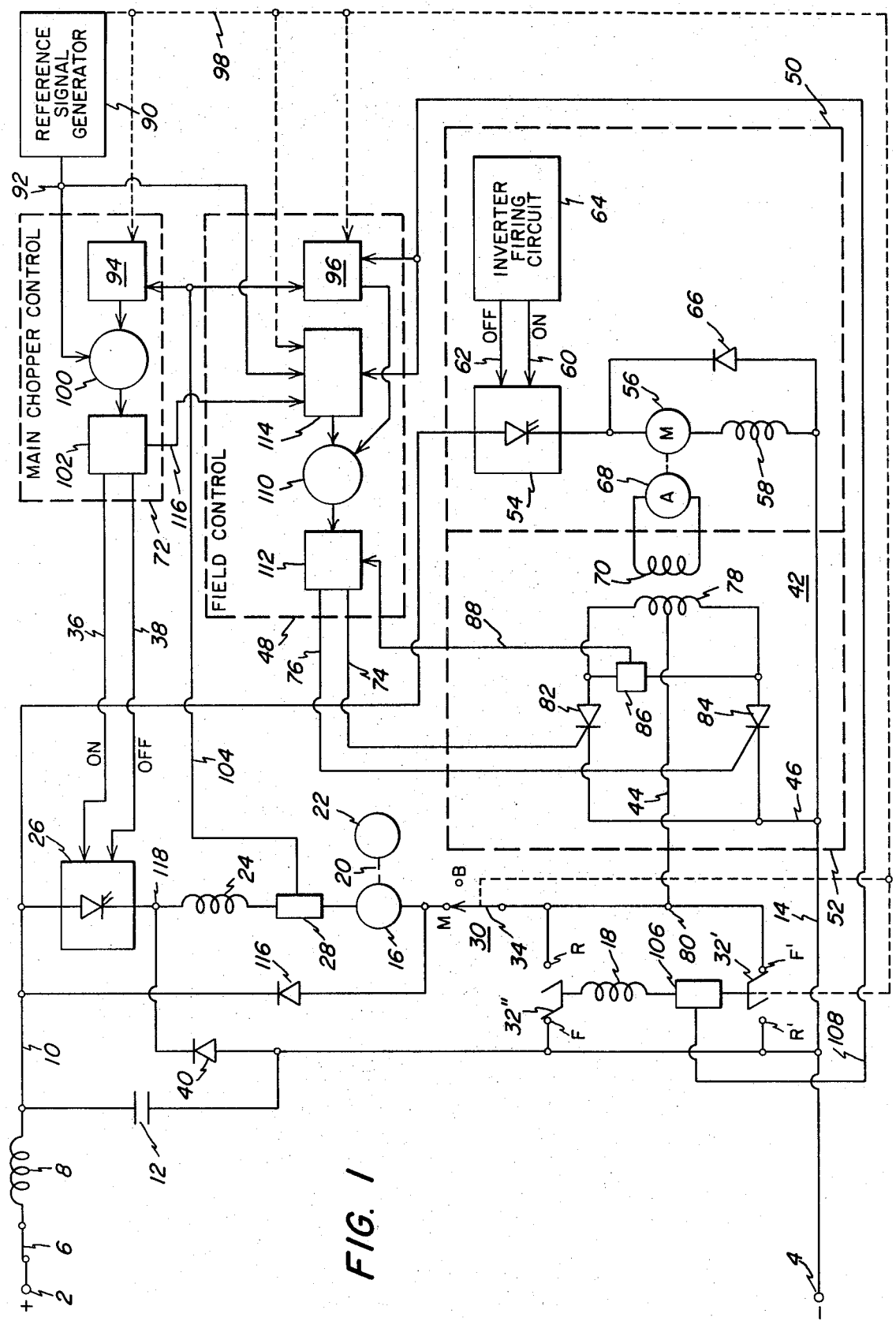
FIG. 1 is a simplified diagram of a motor control system illustrating an embodiment of the invention.

FIG. 1 illustrates one embodiment of the invention in simplified form. This embodiment incorporates a chopper circuit in the motor armature circuit useable to control armature current both during braking and motoring without reconnection. Terminals 2 and 4 are adapted for connection to positive and negative busses, respectively, of a source of direct current. In the case of electric locomotives or transit vehicles, these are commonly provided, respectively, by a catenary, or third rail, and the track rails. Positive terminal 2 is connected through a line switch, or circuit breaker, 6 and a filter reactance 8 to positive line 10. A filter capacitor 12 is coupled between the positive line 10 and the negative line 14 which is connected to terminal 4. Obviously alternative types of line filters may be used, such as those using plural chokes and capacitors in plural cascaded L sections. FIG. 1 illustrates a direct current motor comprising armature 16 and field winding 18. Armature 16 is mechanically coupled, as schematically illustrated by line 20, to a mechanical load 22. In the case of traction vehicles the load normally is a driven wheel axle of the vehicle. Plural motors may be connected in series, and as described in connection with FIG. 3, plural motor groups may be connected in parallel. One terminal of the motor armature 16 is connected through current measuring reactor 28, motor reactance 24, and armature chopper 26 to positive line 10. The other terminal of the motor armature is shown to be connected to motor-brake switch 30. Switch 30 is connection in series circuit with forward-reverse switch 32 and field winding 18 to the negative line 14.

Motor-brake switch 32 is a single pole, single throw switch having a contactor 34 and a motor, M, terminal. During the motor mode contactor 34 contacts terminal M which is connected to armature 16. During the brake mode, the switch is open, as indicated by the B terminal of FIG. 1. Forward-reverse switch 32 is a double pole-double throw switch. Field winding 18 is connected between the two ganged switch contactors 32' and 32''. Switch 32 may be set to the forward position in which case contactor 32' contacts terminal F' and contactor 32'' contacts terminal F, or it may be set to the reverse position in which case contactors 32' and 32'' contact the R' and R terminals respectively. The F and R' terminals are connected to negative line 14 and the F' and R terminals are connected to contactor 34 of the motor-brake switch. The forward-reverse switch serves solely to reverse the connection of field winding 18 when charging drive operation between forward and reverse modes. It is not utilized to change between motor and brake modes. Although a mechanical contactor switch is described, semiconductor or other suitable power switches may be utilized.

During the motor mode, the motor-brake switch is closed so that the motor is connected in circuit between the power lines 10 and 14 by a series circuit comprising the chopper 26, motor reactance 24, current measuring reactor 28, armature 16, motor-brake switch 30, forward-reverse switch 32, and motor field 18. Thus during the motor mode the motor armature and field are serially connected with the chopper and the power source.

As is well-known, the chopper is essentially a switch which is periodically opened and closed. Control is effected by main chopper control 72 which supplies an "ON" gating signal to the chopper on line 36 and an "OFF" gating signal to the chopper on line 38. The conduction duty cycle can be controlled by time ratio control of the ON and OFF periods of the chopper. Choppers conventionally utilize as a switch a controlled rectifier which is capacitance commutated under control of the chopper control circuit. Chopper circuits are disclosed, for example, in the General Electric Company SCR Manual, 4th Edition, Section 11.2.3 and in referenced U.S. Pat. No. 3,515,970. It should be noted that the subject invention may be utilized in conjunction with alternate armature circuit arrangements which do not utilize such a chopper circuit.

In the motor mode the chopper 26 is periodically closed to permit current flow through the serially connected motor reactance 24, current measuring means, such as current measuring reactor, i.e., CMR, 28, the armature 16 and field 18. Rectifying means 40 is connected from negative line 14 to the junction 118 of chopper 26 and motor reactance 24. Rectifying means 40 is connected in parallel with the series combination of reactance 24, CMR 28, armature 16, and field 18, and is poled to conduct armature "freewheeling" current during intervals when the chopper is gated off.

Converter 42 has its output lines 44 and 46 connected across the field winding 18. During the motor mode, the converter operation can be controlled by field control circuit 48 to divert a portion of the armature current so as to provide field weakening. During the brake mode, the converter provides field excitation current. The converter comprises a d-c to a-c converter-inverter 50 and an a-c to d-c converter-inverter 52. The inverter 50 receives its d-c input energy from lines 10 and 14. Its a-c output is coupled to the input of inverter 52, whose d-c signal output appears on above referenced lines 44 and 46.

Inverter 50 may constitute any one of a variety of d-c to a-c inverters and is utilized to convert the available d-c power to the a-c power required at the input of inverter 52. Inverter 50 may therefore be dispensed within installations which have a separate source of alternating current. FIG. 1 illustrates a conventional motor-alternator d-c to a-c converter-inverter system wherein power lines 10 and 14 are connected to a series circuit comprising chopper 54, d-c motor armature 56 and motor field 58. Chopper 54 is utilized to maintain proper current and speed. The chopper duty cycle is controlled by the ON line 60 and OFF line 62 outputs of inverter firing circuit 64. A freewheeling diode 66 is connected in parallel with motor armature 56 and field 58. The motor drives alternator 68 whose a-c output is supplied to the primary winding 70 of a transformer. Adequate control of the converter 42 output may be attained by controlling converter-inverter 52. Therefore chopper 54 and converter-inverter firing circuit 64 need be used solely for start up and shut down of the motor and to properly maintain the a-c output frequency and voltage of the inverter. In some cases the chopper and associated firing circuit may not be required.

Inverter 52 is designed to permit controlled power flow in one direction in lines 44 and 46, during the motor mode to bypass selected quantities of armature current about the field, and to provide controlled flow in a reversed direction during the brake mode, so as to provide field excitation. In the described embodiment, inverter 52 constitutes a phase controlled rectifier of the type, for example, described in Section 3.2 of "Principles of Inverter Circuits," Bedford and Hoft, John Wiley and Sons, Inc. The preferred embodiment utilizes a center tapped full wave rectification circuit. The a-c output of inverter 50 is transformer coupled from primary winding 70 to center taped secondary winding 78. The center tap of this winding is connected to junction 80 of motor-brake switch 34 and forward reverse switch terminals F' and R. The end terminals of secondary winding 78 are connected, respectively, to the anodes of controlled rectifiers 82 and 84. The cathodes of these rectifiers are connected by line 46 to negative line 14. The output of inverter 52, and thus of converter 52, is thus connected by lines 44 and 46 across the motor field winding 18. The control electrodes of devices 82 and 84 are connected by lines 74 and 76, respectively, to field control circuit 48. As described below, field control circuit 48 supplies firing pulses on lines 74 and 76 in a predetermined cyclic order. Circuit 48 controls the phase displacement of these pulses in respect to the a-c voltage input of inverter 52.

In the above described arrangement, the anode voltages of the controlled rectifiers vary periodically in respect to the common terminal connection of the controlled rectifier cathodes, and the anode voltages of the two controlled rectifiers are displaced 180° in respect to each other. The firing pulses on lines 74 and 76 similarly are displaced 180° in respect to each other. In a conventional rectifying circuit, wherein the rectifier firing is not controlled, commutation of the rectifiers is not variable in time with respect to the anode voltage. With phase controlled rectification, however, the turn on of each device, is delayed for a desired interval, forcing commutation, i.e., current transfer from one rectifier to the other, to be delayed.

Operation of the phase controlled rectifier is first described in connection with the brake mode. During this mode, the motor-brake switch 30 is open and the field is excited by current supplied from the phase controlled rectifier on lines 44 and 46. If each of controlled rectifiers 82 and 84 is fired when its anode voltage has advanced to about 90°, i.e., each device conducts from 90° to 270°, the average voltage during the time of conduction is zero. There is no net current flow in the circuit comprising lines 44 and 46 and field 18. If the firing angle is advanced from 90° toward 0°, there is an average positive potential on line 46 with respect to line 44 so that current flows from line 46 through the field winding 18 and line 44. The magnitude of the average potential, and of the field current increases as the firing is advanced from 90° toward zero, so as to permit control of field excitation current by adjustment of the firing angle.

During the motoring mode, armature current flows through closed switch 30 and field 18. Thus field current and field voltage polarity during braking is opposite to the polarity during motoring. During motoring, the phase controlled rectifier operates in the inversion mode, i.e., firing of the controlled rectifiers is retarded beyond 90°. In the inversion mode the average d-c voltage on line 46 becomes increasingly negative in respect to line 44 as furing is retarded. If firing is sufficiently retarded the average potential between lines 44 and 46 equals the field voltage due to normal armature current. At this point, there is no net current flow through lines 44 and 46, and therefore no field shunting. If firing is advanced from that point toward 90°, the controlled rectifier shunts increasing quantities of armature current about the field. Therefore, during the motor mode, the field may be weakened by advancing firing toward 90°. The system should be designed so that the maximum firing angle called for by the control does not exceed that which will still allow adequate time for commutation.

Figure 2A:
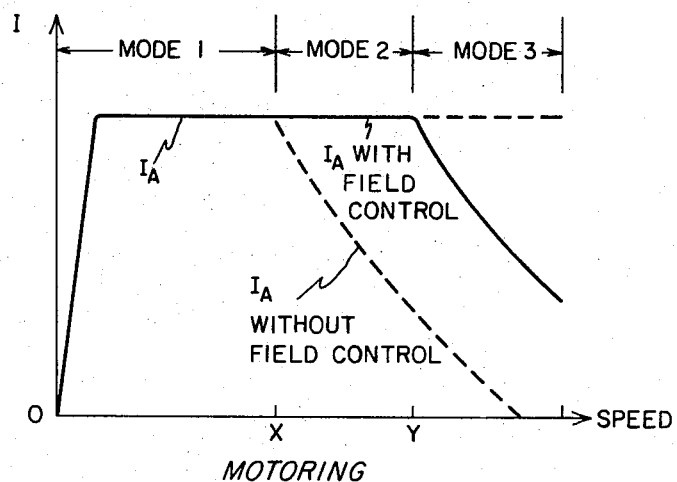
FIG. 2 is a chart of correlated curves representing electrical parameters during the motoring and braking modes, useful in understanding operation of the invention.

Reference is made to FIG. 2 for one example of possible motor drive operation. FIG. 2A illustrates one example of motor armature current vs. speed operation during the motor mode. As speed increases armature current is increased rapidly to a predetermined maximum amplitude. During the interval labeled mode 1, the armature current is maintained constant by increasing the duty cycle of the armature chopper 26. At a predetermined speed X, termed the motor corner point, chopper 26 operates at maximum duty cycle. As motor speed, and motor counter emf, increases further, the chopper continues to operate at maximum duty cycle. Therefore, motor armature current, and thus torque, would diminish rapidly as indicated by the dashed line. However, field weakening may be initiated, at speed X, to maintain constant armature current, and thus increased motor torque over full field torque. Field weakening is increased to maintain constant armature current as motor speed increases from speed X to speed Y, i.e., the speed interval labeled mode 2. During this interval field current is reduced in respect to armature current. Speed Y is termed the motor commutation limit, since substantial decreases of field current in respect to armature current at higher speeds may result in poor motor commutation. Accordingly at such higher speeds, labeled as mode 3, the field current is reduced proportionally with further reductions of armature current. This results in the indicated decrease of armature current at speeds exceeding speed Y.

Reference is again made to FIG. 1 for a brief description of field and main chopper control operation during the above described motor sequence. FIG. 1 illustrates the main chopper and field control circuits in simplified form solely for purpose of explanation and omits protection and some other circuits conventionally employed. The control circuitry can of course be varied to accommodate any desired form of operation.

Motor drive systems conventionally utilize feedback loop control systems wherein actual motor performance is compared with desired or commanded motor performance so as to generate an error, or reference, signal. The reference signal modifies motor operation so as to conform the desired performance. For example, a speed command signal is commonly utillized in traction vehicle operation, which is compared with a signal corresponding to the actual speed of the motor. The actual speed signal may be derived from a tachometer coupled to the motor shaft or the load driven by the motor. The two signals are compared to generate the reference signal. Reference signal generator 90 represents the circuitry for generating the reference signal output, which is shown to be supplied on line 92 to main chopper and field controls 72 and 48. Generator 90 also provides outputs indicative of desired operating mode, e.g., motor or brake, forward or reverse. These outputs are supplied to appropriate contactor control circuits, including those required to open motor-brake switch 30 during the brake mode and to switch the forward-reverse contactors 32' and 32" to the R' and R terminals, respectively, during the reverse operating mode. Additionally the mode signals may be applied to mode control circuit 94 in the main chopper control 72 and mode control circuits 96 and 114 in the field control 48. In the simplified rendition of FIG. 1 all of these mode control outputs are schematically indicated by dashed line 98.

In the simplified main chopper control arrangement illustrated in FIG. 1, an output of mode control circuit 94, in this case indicative of motor armature current, is compared with the reference signal supplied on line 92, by comparison circuit 100. The ouput of this circuit, representative of the desired duty cycle, i.e., the ratio of ON to OFF time of the chopper 26, is supplied to the chopper firing control circuit 102, which supplied ON and OFF gate firing pulses to chopper 26 on lines 36 and 38, respectively. Circuits generating such firing signals are well-known in the art, and are, for example disclosed in applicant's previously referenced U.S. Pat. No. 3,515,970.

Current measuring reactor 28, in the motor armature circuit provides an output signal, indicative of armature current, on line 104. Line 104 is illustrated as being connected to mode control circuit 94, in main chopper control 72, and to mode control circuit 96, in field control 48. Another current measuring reactor 106 is connected in circuit with motor field 18. Its output, indicative of field motor current, is coupled by line 108 to another input of mode control circuit 96 and to one input of mode control circuit 114. The reference signal on line 92 is applied to the other input of mode control circuit 114. The outputs of these mode control circuits are applied to comparison circuit 110 of field control 48. The comparison circuit receives a first input from circuit 96 while depending on the mode of operation as either a function of armature current or field current, and a second input from circuit 114 which is either a function of the reference signal or of field current. The output of the comparison circuit is supplied to the firing circuit 112 which supplies firing pulses on lines 74 and 76 to the controlled rectifiers 82 and 84 of inverter 52. The firing pulses on lines 74 and 76 are phase synchronized in respect to the a-c signal input of inverter 52. For this purpose voltage sensor 86 supplies a voltage signal on line 88 to firing circuit 112. Firing pulses on lines 74 and 76 are displaced 180° in respect to each other. Their phasing in respect to the a-c signal is controlled by the signal supplied by comparison circuit 110 to firing circuit 112. Firing circuits of this type are well-known and are for example disclosed in applicant's U.S. Pat. No. 3,257,597. Reference is also made to U.S. Pat. No. 3,564,365 for its disclosure of firing pulse circuitry operable in response to a control signal to selectively operate a converter system in rectification or inversion modes.

Reference is again made to FIG. 2A for further explanation of main chopper and field control circuitry during motoring. In the previously described example it is initially assumed that no field weakening is required during mode interval 1, i.e., operation from zero speed to speed X. Accordingly the field control circuit is designed such that no current flows in line 44 during this mode interval, i.e., the firing pulses on lines 74 and 76 occur when the anode voltage on rectifiers 82 and 84, respectively has advanced sufficiently beyond 90°C. During this mode, the field current signal on line 108 is compared with the armature current signal supplied on line 104 to maintain zero current flow in line 44. In this mode, comparison circuit 110 receives from circuit 96 an output representative of the armature current signal and from circuit 114 an output representative of the field current. The output signal of comparison circuit 110 retards the pulses on lines 74 and 76 sufficiently to maintain the field current equal to the armature current, i.e., zero current in line 44. Alternatively feedback circuit comprising a current sensor in output line 44 could be utilized to maintain zero current in line 44.

During motor mode interval 1, the chopper conduction duty cycle increases with increasing motor speed. This is achieved by comparing in comparator 100 the reference signal, indicative of desired armature current, with the actual armature current supplied to the comparator 100 through mode control circuit 94. The comparator output signal is supplied to chopper firing circuit 102, such that the ON time ratio of the chopper increases with speed and the chopper operates at its maximum conduction duty cycle at motor speed X. The waveforms of FIG. 2 are based on the assumption that the reference signal remains constant. Accordingly, armature current is maintained constant during interval 1.

During motor mode interval 2, no further armature current control can be attained by chopper 26, and it continues to operate at maximum duty cycle. A signal indicative of the chopper's having attained maximum duty cycle operation is supplied to field control 48, as indicated by line 116 connected from chopper firing circuit 102 to mode control circuit 114, so as to commence field weakening control by the field control circuit 48. During motor mode interval 2, mode control circuit 114 couples the reference signal on line 92 to comparator 110, and mode control circuit 96 couples the armature current signal on line 104 to comparator 110. The comparator compares the armature and reference current signals, since the reference signal is assumed to remain constant as speed increases about speed X, the output of the comparator 110 varies so as to maintain a constant armature current. The output of the comparator coupled to firing circuit 112, causes the firing pulses on lines 74 and 76 to be advanced in respect to the anode voltages of devices 82 and 84. This causes inverter 52, being operated in the inversion mode, to divert increasing magnitudes of armature current from the motor field so as to maintain constant armature current with increasing speed.

Mode control circuit 96 simultaneously senses the armature current, supplied on line 104, and field current, supplied on line 108. When the field current decreases to a predetermined percentage of armature current, operation of the field control circuit switches to that previously described in connection with motor mode interval 3. As motor speed increases beyond the speed identified as Y in FIG. 2a, field current is decreased at a lower rate such that the ratio of armature to field current remains constant.

The above description relates to one form of motor mode operation. Similarly an exemplary form of brake mode operation is now described. The inventive arrangement may be utilized in conjunction with either dynamic or regenerative braking of combinations of the two. Typical of the latter are arrangements for using regenerative braking when the energy source connected to terminals 2 and 4 is receptive, and to switch to dynamic braking when the energy source is not receptive. FIG. 1 illustrates a regenerative braking circuit. During braking, motor-brake switch 30 is opened, and field 18 is simultaneously energized by operating inverter 52 in the rectification mode. This causes field current to flow from line 46, forward-reverse switch 32, field 18 and line 44. Therefore field current flow is reversed in respect to the motor mode, and such reversal is attained without the necessity of physically reversing the field winding terminals in the armature circuit. Because of this field current reversal, the motor operates as a generator with armature current flow continued in the same direction as in the motor mode, but with armature voltage polarity reversed.

In the described embodiment, armature chopper 26 continues to periodically switch in the brake mode with its conduction duty cycle being related to the desired braking torque. Unilaterally conducting means 116 is connected in shunt with armature 16, CMR 28, reactance 24, and chopper 26. Rectifier 116 is poled to conduct during intervals of chopper conduction, so as to complete the armature circuit. Conceivably a simple switch, closed solely during the brake mode, could be used in lieu of rectifier 116. During intervals when the chopper is cutofff, armature current flows through rectifier 116, filter reactor 8, normally closed switch (or breaker) 6, positive terminal 2, the source of electric power (not shown), negative terminal 4, line 14, rectifying means 40, motor reactor 24, and CMR 28 to complete the armature circuit. Thus regenerative braking is attained by absorbing armature power in the power source during intervals when chopper conduction is cutoff.

Dynamic braking can be achieved by appropriate connection of an energy absorbing load, such as a braking resistance, in the motor armature circuit. There are various known arrangements for connecting a braking resistance in series with switching means, e.g., a controlled rectifier, so that the braking resistance is utilized during time intervals when the power source is not receptive for regenerative braking. For example, the serially connected braking resistance and controlled rectifier may be connected in parallel with chopper 26 so that generated armature current flows through the braking resistance, in lieu of the chopper 26, during intervals when the controlled rectifier is gated on and when the chopper is cutoff during the brake mode.

Figure 2B:
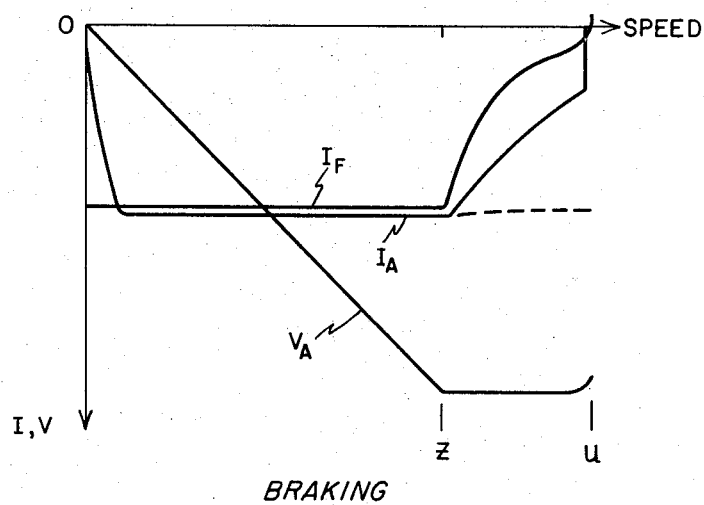

One exemplary form of braking control is now discussed with reference to FIG. 2b, which illustrates variation of armature voltage $V_A$, armature current $I_A$ and field current $I_F$ with motor speed. It is assumed that adequate braking torque control can be obtained at speeds below a speed Z solely by using armature current control. The field current is therefore constant and the armature voltage, varying as a function of motor speed, increases with speed up to speed Z. At speeds in excess of speed Z, field control is utilized in order to limit the magnitude of the field voltage to the magnitude attained at speed Z.

For purposes of explanation assume that braking is initiated at a speed U, which is higher than speed Z, and that there is no motor field current at the instant that the control system is switched from motoring to braking. Accordingly there is no initial armature current nor braking torque. An initial amount of field current is then applied resulting an in initial rise in armature current and an immediate rise in armature voltage. This initiates the retarding torque. The resulting decrease of speed from W to Z would with a constant field result in a decrease of armature voltage. However the field current is controlled so as to maintain a constant armature voltage in excess of the voltage of the power source. Thus the field current is increased, and the armature current is appropriately increased, as the speed is reduced.

As speed is reduced to speed Z, the field current reaches a predetermined magnitude. As speed is further reduced the field current remains constant and control is assumed by chopper 26 so as to maintain a constant armature current as speed is further reduced. As speed is reduced to a value close to zero, the motor armature current necessarily decreases.

Reference is again made to FIG. 1 for a description of one form of control system for attaining the above described type of electric retardation. At speeds in excess of speed Z, field current is controlled so as to maintain a constant armature voltage with variations of speed. This may be accomplished by appropriately modifying the reference signal on line 92 as a function of armature voltage. The reference signal input in reference signal generator 90 is during the brake mode summed with an offset armature voltage signal such that the modified reference signal on line 92 appropriately deviates from the unmodified reference signal whenever the armature voltage exceeds a desired level. Between speeds U and Z only field current is utilized. The modified reference signal on line 92, representative therefore, of armature current, is applied through mode control circuit 114 to one input of comparator 110, and the armature current signal on line 104 is applied through mode control circuit 96 to another input of the comparator. Alternatively the modified reference signal could be compared with the field current signal. The waveforms of FIG. 2 are based on the assumption that the unmodified reference signal remains constant, such as indicated by the dashed lines. The output of the comparator and of the firing circuit 112 therefore controls the phasing of pulses on lines 74 and 76, and thus the magnitude of field current so as to maintain a desired armature current as speed is decreased. The field current therefore increases as the speed is reduced toward speed Z. As the speed decreases beyond speed Z, the armature voltage falls below the desired maximum level. At speeds below Z, the unmodified reference signal, which is assumed to remain constant, and the field current signal, supplied from line 108 through circuit 96, as compared so that field current is maintained at a constant level.

At speeds below speed Z, further control is maintained, by main chopper control 72. The armature current signal on line 104 is supplied, through mode control circuit 94, to one input of comparator 100 and the reference signal on line 92 is supplied to the other input of this comparator. Thus with a constant reference signal, the output of the comparator, and of firing control circuit 102, causes the chopper duty cycle to be controlled so as to maintain a constant armature current as speed is further decreased. As speed is decreased the armature voltage decreases. However as the chopper duty cycle is varied in the sum of the reactance voltage across the motor reactance and of the armature voltage is adequate to provide regenerative braking.

The above description refers to initiating braking by increasing field current so as to produce armature current and braking torque. In the embodiment of FIG. 1, to the extent it relies solely on regenerative braking for electric retardation, generated armature current can not be absorbed by the power source until the armature voltage equals or exceeds the line voltage. Prior thereto rectifying means 40 blocks the flow of generated armature current. The armature voltage is, however, rapidly increased to the level required to initiate braking. It may be desirable to supplement the previously described field control system with an arrangement to prevent the armature voltage from substantially overshooting the power source voltage at the time braking is initiated. This may be accomplished by sensing the difference between the line voltage and armature voltage and to supply the difference signal through a rate control circuit so as to initially control the phasing of pulses on lines 74 and 76.

The above described methods and means of chopper and field control have been disclosed by way of example. Alternate control arrangements can also be utilized.

Figure 3:
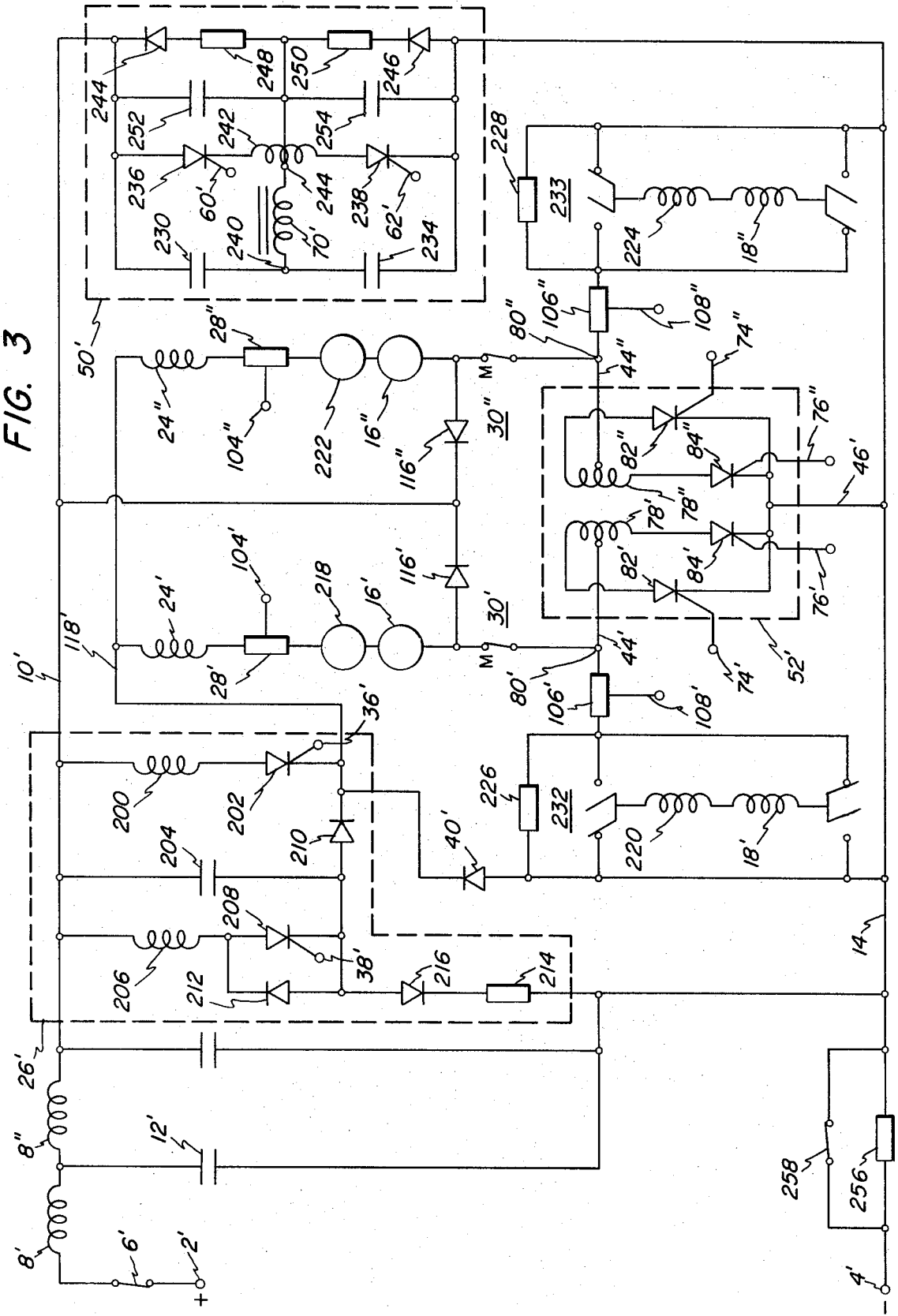
FIG. 3 is a diagram of a preferred embodiment of the invention designed for application to traction vehicles operation.

FIG. 3 illustrates a preferred embodiment of the invention having substantial similarities to the embodiment of FIG. 1. Similar components are therefore identified by common identification numerals. The embodiment of FIG. 3 illustrates the use of plural groups of serially connected motors and of an alternative type of d-c to a-c converter inverter.

Positive terminal 2' is connected through suitable breaker and line switch 6' and filter reactors 8' and 8" to positive line 10'. The armature chopper 26', of a type similar to that disclosed in U.S. Pat. No. 3,515,970, is connected between line 10' and junction 118'. The chopper comprises a main chopper reactance 200 and main controlled rectifier 202 connected serially between line 10' and junction 118'. A commutating capacitor 204 is connected in parallel with series connected commutating reactance 206 and commutating controlled rectifier 208. Reactances 206 and 200 are connected to line 10', and the cathode of rectifier 208 is connected serially with coupling diode 210 to junction 118'. Controlled rectifiers 202 and 208 are poled in the forward direction and their control gates, are, respectively, connected to ON line 36' and OFF line 38'. A commutating diode 212 is connected in parallel with rectifier 208 and oppositely poled in respect thereto. A charging network comprising resistor 214 and diode 216 is connected from negative line 14' to the junction of diodes 210 and 212, rectifier 208 and capacitor 204.

Four motors are connected in series parallel configuration between junction 118' and negative line 14'. A first circuit comprises serially connected motor resistance 24', CMR 28', first motor armature 218, second motor armature 16', motor-brake switch 30', CMR 106', forward-reverse switch 232, first motor field 220, and second motor field 18'. A second circuit, connected in parallel with the first circuit, comprises serially connected motor reactance 24", CMR 28", third motor armature 222, fourth motor armature 16"', motor-brake switch 30", CMR 106", forward-reverse switch 233, third motor field 224, and fourth motor field 18".

A series resistance 256 shunted by contactor 258 may be connected in line 14' intermediate line terminal 4' and the connection of filter capacitor 12'. Under normal conditions the contactor is closed so as to shunt out resistance 256. The contactor 258 is opened when the voltage across capacitor 12' decreases substantially. This may be accomplished by a voltage sensor not shown, connected across a filter capacitor. This provides for soft charging, i.e., it avoids an excessive in rush of current into the filter during energization. Such a soft charge circuit may of course be connected in another position of the series circuit comprising line terminals 2' and 4' and the filter. Freewheeling diode 40' is connected from line 14' to junction 118'. Diode 116' is connected from the junction of armature 16' and switch 30' to line 10'. Diode 116" is connected from the junction of armature 16"' and switch 30" to line 10'. Diodes 116' and 116" are poled to conduct generated armature current during the brake mode. Antisparking resistors 226 and 228 are connected from line 14' to the junctions, respectively, of CMR 106' and switch 232, and of CMR 106" and switch 233.

Junction 80', of CMR 106' and motor brake switch 30', is connected by line 44' to the center tap of transformer winding 78' whose end terminals are connected through controlled rectifiers 82' and 84' to negative lines 46' and 14'. The control electrodes of these rectifiers are connected, respectively, to firing pulse lines 74' and 76'.

Similarly junction 80", of CMR 106" and switch 30" is connected by line 44" to the center tap of transformer winding 78" whose end terminals are connected through controlled rectifiers 82" and 84" to lines 46' and 14'. The control electrodes of these rectifiers are connected, respectively, to firing pulse lines 74" and 76".

In this embodiment, therefore, a-c to d-c converter inverter 52' comprises two phase controlled rectifier sets of the type described in connection with FIG. 1. Both receives their a-c input from a common d-c to a-c inverter 50' by coupling the alternating current to transformer windings 78' to 78". Thus serially connected motor fields 18' and 220 are connected in parallel by lines 44' and 46' with the output of one phase controlled rectifier. Serially connected motor fields 18" and 224 are connected in parallel by lines 44" and 46' with the output of the second phase controlled rectifier.

The d-c to a-c converter-inverter 50' connected between lines 10' and 14' constitutes a complementary impulse commutated inverter of the type described, for example, in Section 7.4, page 190, of "Principles of Inverter Circuits" by Bedford and Hoft. Capacitors 230 and 234 are serially connected between lines 10' and 14' so as to provide a point of intermediate voltage at their junction 240. A second series circuit between lines 10' and 14' comprises controlled rectifiers 236 and 238 and center-tapped inductance 242. The anode of device 236 is connected to line 10', its cathode is connected to one end terminal of inductance 242. The anode of device 238 is connected to the other end terminal of inductance 242 and the cathode is connected to line 14'. The primary winding 70' of the converter output transformer is connected between the center-tap 244, of inductance 242, and terminal 240. Primary winding 70' is of course transformer coupled to secondary windings 78' and 78" in converter inverter 52'. Feedback diode 244 and a small resistance 248 are, connected in series between line 10' and junction 244. Similarly feedback diode 246 and resistance 250 are connected in series between line 14' and junction 244. Commutation capacitors 252 and 254 are connected between junction 244 and, respectively, lines 10' and 14'. The diodes, connected in inverse parallel with the controlled rectifiers, feedback energy stored in the inductance 242 after commutation, and the resistances appropriately dissipate the trapped energy. Controlled rectifiers 236 and 238 are gated sequentially at a predetermined frequency by means of periodic firing pulses applied by lines 60' and 62' to their respective control gates. These are genertated by an inverter firing circuit, as described in connection with FIG. 1. Converter-inverter 50' operates analogously to the motor-alternator system described in connection with FIG. 1. It can convert d-c power to a-c, such as during the braking mode, and can convert a-c power to d-c.

Operation of the embodiment of FIG. 3 is substantially identical to that described in connection with FIG. 1. During the motor mode, motor-brake switches 30' and 30" are closed so that the field of each motor is connected in series with its armature. Thus fields 18' and 220 are connected serially with armatures 16' and 218, and fields 18" and 224 are connected serially with fields 16" and 222. During intervals when the chopper 26", i.e., controlled rectifier 202, conducts, motor current flows from line 10' through the chopper 26' and the two parallel motor circuits to line 14'. One motor circuit comprises devices 24', 28', 218, 16', 30', 106', 232, 220, 18'. The other motor circuit comprises devices 24", 28", 222, 16", 30", 106", 233, 224, 18". During intervals when the chopper 26' is cutoff, freewheeling current flows through these two parallel connected motor circuits and freewheeling rectifying means 40'. Field weakening is attainable by controlling the phase of the firing pulses on lines 74', 76', 74" and 76" so that the desired magnitude of armature current is shunted about the fields by the converter. Thus a controlled amount of current from armatures 16' and 218 may be shunted through the inverter 52' circuit comprising lines 44' and 46', secondary transformer winding 78' and controlled rectifiers 82' and 84'. Current from armatures 16" and 222 is similarly shunted in the circuit comprising lines 44" and 46' and devices 78", 82" and 84".

During braking, motor-brake switches 30' and 30" are opened. The motor fields are separately excited by the converter. The phase controlled rectifier comprising components 78', 82' and 84' is operated in rectification mode to provide field current through lines 44' 46' to fields 181 and 220. Similarly the phase controlled rectifier comprising components 78", 82" and 84" provides field current to fields 18" and 224. During intervals when the chopper 26' conducts, generated armature current is absorbed by the power source. Thus generated current from armatures 16' and 218' flows, in the series circuit comprising rectifying means 116', line 10', the power source, line 14', rectifying means 40', reactance 24' and CMR 28'. Similarly, current from armatures 16" and 224 flows in the circuit comprising components 116", 10', the power source, 14' 40', 24" and 28". Field and chopper control may be obtained as described in connection with FIG. 1. Alternate means for energy absorption during electric retardation may be utilized such as the dynamic braking arrangement described in connection with FIG. 1.

While the invention has been particularly shown and described with reference to a preferred embodiment, it will be understood by those skilled in the art that the foregoing and other changes in form and detail may be made therein without departing from the spirit and scope of the invention.

What I claim as new and desire to secure Letters Patent of The United States is:

1. A drive system wherein d-c electric motor means comprising armature and field means are coupled to a mechanical load to drive the load in a motor mode and to be driven by the load in a braking mode so as to generate armature current dissipated in a braking load circuit and retard motion of the load, comprising:
   a. a source of d-c energy having first and second conductors;
   b. armature means and field means;
   c. motor-brake switching means coupled in circuit between said armature and field means to connect said field and armature means in a series circuit with said source only during the motor mode;
   d. power conversion means having its output coupled to shunt said field means and operable in inversion or rectification modes to selectively shunt armature current from said field means during the motoring mode to provide field weakening, and to provide excitation current to said field means during the braking mode.

2. The arrangement of claim 1 wherein said armature means is coupled to said first conductor, said field means is coupled to said second conductor, and means for establishing a braking energy absorption circuit with said armature means during the braking mode.

3. The arrangement of claim 2 wherein said armature means is coupled through variable impedance means to said first conductor for controlling armature current.

4. The arrangement of claim 3 wherein said variable impedance means comprises periodically actuated chopper means whose conduction duty cycle is variable to control armature current.

5. The arrangement of claim 4 comprising first control means operative during the motor mode for increasing the conduction duty cycle of said chopping means with increasing speed of said d-c electrical motor means and second control means operative during the motor mode to shunt armature current from said field means upons said chopper means attaining a predetermined conduction duty cycle.

6. The arrangement of claim 5 wherein the magnitude of the armature current shunted from said field means is controlled to maintain armature current at a predetermined relationship to the speed of the motor means.

7. The arrangement of claim 6 wherein said first control means maintains said armature current constant during a predetermined speed interval.

8. The arrangement of claim 7 wherein the first control means modifies the conduction duty cycle of said chopper means to maintain a constant armature current over a first predetermined motor speed interval and said second control means modifies the magnitude of armature current shunted from said field means over a second predetermined motor speed interval to control armature current until field current is reduced to a predetermined portion of armature current.

9. The arrangement of claim 2 wherein said power conversion means comprises d-c to a-c to d-c conversion means having a d-c input coupled to said source of d-c energy and a d-c output variable intermediate predetermined valuse of rectification and inversion.

10. The arrangement of claim 9 wherein said conversion means comprises d-c to a-c inversion means and phase controlled rectifying means, said phase controlled rectifying means having an a-c input supplied from said d-c to a-c inversion means and a controlled output coupled across said field means.

11. The arrangement of claim 10 wherein said phase controlled rectifying means comprises controlled rectifier means, and control means for controllably phasing the firing said rectifying means in respect to said a-c input to provide for selective variation of said output between predetermined voltage magnitudes of one polarity (i.e., inversion) and of an opposite polarity (i.e., rectification);

12. The arrangement of claim 11 wherein said control means is adapted to selectively advance firing of said rectifying means during the motoring mode to shunt armature current through said controlled rectifying means and to further advance firing of said rectifying means during the braking mode to provide evergization current to said field means.

13. An electric drive motor system wherein d-c electrical motor means are energized from an electrical source in a motoring mode and wherein during a braking mode said motor means operates as electrical generating means providing electrical energy to a braking load comprising:

a. a source of d-c energy comprising first and second conductors;

b. motor armature chopper means; motor armature means, motor switching means, and motor field means connected in the order recited in a series circuit between said first and second conductors;

c. rectifying means connected in parallel with the serially connected combination of said armature means motor switching means and motor field means, and poled to pass motor armature current during intervals when said chopper means is cut off;

d. means adapted to couple a braking energy absorption circuit with said armature means to pass armature current during turn off of said chopper means in the braking mode;

e. power conversion means producing a controllable d-c output, variable between a maximum value of one polarity to a maximum value of the opposite polarity, said output being coupled across said motor field means;

f. control means for controlling the output of said power conversion means to selectively energize said field means during the braking mode and to shunt selective portions of armature current about said field means during the motoring mode, and g. means for closing said motor switching means during the motor mode, but not during the brake mode to serially connect the chopper means, armature means and field means across said source.

14. The arrangement of claim 13 adapted for regenerative braking wherein said rectifying means is coupled from one terminal of said motor armature means to said first conductor and means adapted to pass current solely during the braking mode coupled from the other terminal of said motor armature means to said second conductor.

15. The arrangement of claim 14 wherein said means adapted to pass current comprises unilaterally conducting means poled to pass armature current generated during the braking mode.

16. The arrangement of claim 13 wherein said power conversion means comprises d-c to a-c to d-c inversion means having its d-c input coupled to said source of d-c energy.

17. The arrangement of claim 16 wherein said d-c to a-c to d-c inversion means comprises first inverting means for inverting d-c energy to a-c energy, and second means comprising phase controlled rectifying means for converting a-c energy to d-c energy appearing at the output of said conversion means, said control means comprising means for selectively advancing the firing of said rectifying means during acceleration in the motoring mode and for selectively further advancing the firing of said rectifying means deceleration in during the braking mode.

18. The arrangement of claim 17 wherein said second means comprises a center-tapped transformer winding and first and second semiconductor controlled rectifiers connected in a full wave rectifying arrangement about said motor field means, and the a-c output of said first inverting means is transformer coupled to center-tapped winding.

19. The arrangement of claim 18 wherein said first inverting means comprises static d-c to a-c converting means commutated at a predetermined frequency.

20. The arrangement of claim 16 comprising plural d-c electric motor means connected in parallel to one another; and wherein said d-c to a-c to d-c inversion means comprises a common inverting means for inverting d-c energy to a-c energy, and plural a-c to d-c conversion means, the output of each of said a-c to d-c conversion means being coupled in shunt with the field means of a different one of said parallel connected motor means.

21. The arrangement of claim 20 wherein each of said a-c to d-c conversion means comprises phase controlled rectifying means, said control means comprising means for selectively advancing the firing of said rectifying means during the motoring mode and for selectively further advancing the firing of said rectifying means during the braking mode.

* * * * *

UNITED STATES PATENT OFFICE
CERTIFICATE OF CORRECTION

PATENT NO. : 3,866,098
DATED : Feb. 11, 1975
INVENTOR(S) : E. F. Weiser

It is certified that error appears in the above-identified patent and that said Letters Patent are hereby corrected as shown below:

Column 2, line 2, "regtardation" should be corrected to -- retardation --

Column 2, line 64, delete "to" and substitute -- in --

Column 4, line 14, delete "charging" and substitute -- changing --

Column 7, line 17, delete "utillized" and substitute -- utilized --

Column 8, line 30, delete "90°C" and substitute -- 90°. --

Column 9, line 53, delete "16." and substitute -- 16, --

Column 13, line 4, delete "receives" and substitute -- receive --

Column 14, line 54, delete "a"

Column 15, line 38, delete "valuse" and substitute -- values --

Column 16, line 48, insert "the" between "to" and "d-c"

Column 16, line 53, insert "during" between "means" and "deceleration"

Column 16, line 54, delete "during"

Column 16, line 61, insert "said" between "to" and "center-"

Signed and sealed this 10th day of June 1975.

(SEAL)
Attest:

RUTH C. MASON
Attesting Officer

C. MARSHALL DANN
Commissioner of Patents
and Trademarks